(12) United States Patent
Adams

(10) Patent No.: US 6,569,961 B1
(45) Date of Patent: May 27, 2003

(54) EMULSION POLYMERIZATION PROCESS AND REACTOR FOR SUCH A PROCESS

(75) Inventor: David Charles Adams, Lancashire (GB)

(73) Assignee: Akzo Nobel NV, Arnhem (NL)

( * ) Notice: Subject to any disclaimer, the term of this patent is extended or adjusted under 35 U.S.C. 154(b) by 139 days.

(21) Appl. No.: 09/710,945

(22) Filed: Nov. 13, 2000

(30) Foreign Application Priority Data

Nov. 11, 1999 (EP) .............................. 99309005

(51) Int. Cl.⁷ .............................. C08F 2/22; B01J 19/00
(52) U.S. Cl. .............................. 526/64; 526/67; 526/88; 526/918; 422/132
(58) Field of Search .............................. 526/64, 67, 918, 526/88; 422/132

(56) References Cited

U.S. PATENT DOCUMENTS

| | | | |
|---|---|---|---|
| 2,072,904 A | 3/1937 | Ries ............................... | 260/2 |
| 3,262,922 A | 7/1966 | Payne ........................ | 260/93.7 |
| 3,458,467 A * | 7/1969 | Herrle et al. .............. | 526/64 X |
| 3,560,454 A * | 2/1971 | Buning et al. ................. | 526/64 |
| 4,121,029 A | 10/1978 | Irvin et al. ..................... | 526/64 |
| 4,468,257 A | 8/1984 | Kaneko et al. .......... | 134/22.13 |

FOREIGN PATENT DOCUMENTS

| | | | |
|---|---|---|---|
| DE | 39 12 611 | 11/1989 | ............. C08F/6/24 |
| EP | 0 145 325 | 6/1985 | ............. B01J/3/04 |
| GB | 2 217 337 | 10/1989 | ............. C08J/11/00 |
| JP | 56 133302 | 10/1981 | ............. C08F/2/22 |
| JP | 11 12308 | 1/1999 | ............. C08F/2/02 |

OTHER PUBLICATIONS

*Abstract*, 1999–148581.
*Patent Abstracts of Japan*, 56133302, Oct. 19, 1981.
International Preliminary Examination Report No. PCT/EP00/09909 dated Feb. 14, 2002.

* cited by examiner

*Primary Examiner*—Fred Teskin
(74) *Attorney, Agent, or Firm*—Lainie E. Parker

(57) ABSTRACT

An emulsion polymerization process using a reactor having one or more circulation loops with one or more inlets for raw material, one or more inlets for a carrier liquid in which the polymer to be formed is insoluble, and one or more outlets for polymer emulsion; and one or more driving means for continuously circulating the reactor charge within the circulation loop. An emulsion polymerization process includes charging the reactor with raw material, including monomers, and with the carrier liquid, including stabilizers, and optionally other additives; then continuously feeding the loop reactor with the raw material and with the carrier liquid; and continuously withdrawing part of the reactor charge from the reactor at a rate equal to the rate of total raw material and carrier liquid feeding. The carrier liquid, or water phase, consists wholly or partially of washings used for washing one or more parts of the same or a different polymerization reactor and/or associated equipment. The invention also pertains to a loop reactor for carrying out such process.

16 Claims, 1 Drawing Sheet

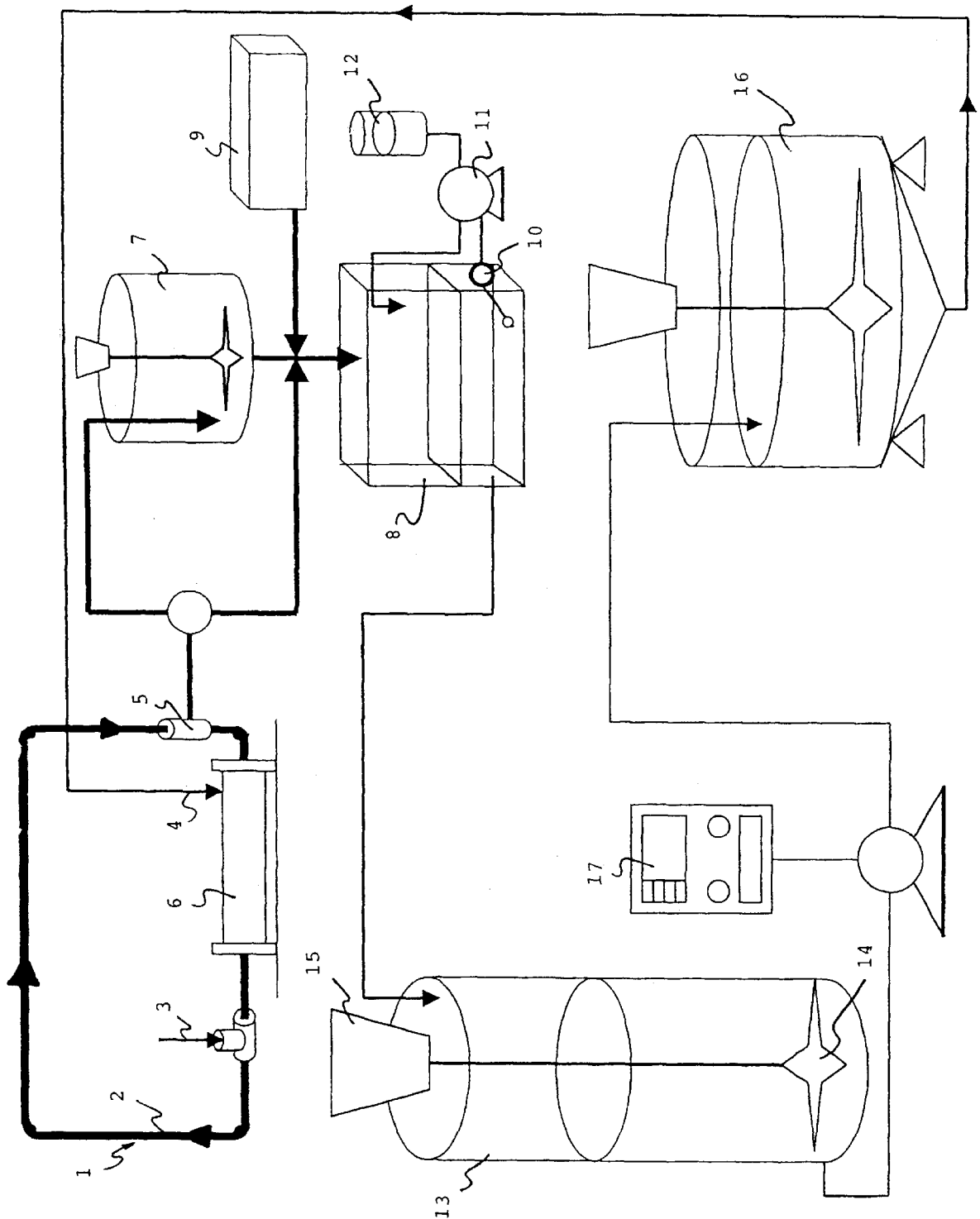

EMULSION POLYMERIZATION PROCESS AND REACTOR FOR SUCH A PROCESS

FIELD OF THE INVENTION

The present invention relates to an emulsion polymerization process using a reactor having:
one or more circulation loops with one or more inlets for raw material, one or more inlets for a carrier liquid in which the polymer to be formed is insoluble, and one or more outlets for polymer emulsion;
one or more driving means for continuously circulating the reactor charge within the circulation loop,
the process comprising the steps of:
charging the reactor with raw material, including monomers, and with a carrier liquid, including stabilizers, and optionally other additives;
then continuously feeding the loop reactor with the raw material and with the carrier liquid;
and continuously withdrawing part of the reactor charge from the reactor at a rate equal to the rate of total raw material and carrier liquid feeding.

The invention also relates to a reactor for such a process.

Generally, the carrier liquid is aqueous and is designated as the "water phase."

BACKGROUND OF THE INVENTION

An emulsion polymerization process and a reactor therefor are described in European patent application EP-A 0 145 325. In the process as disclosed in this publication polymer emulsions are manufactured by the addition polymerization of olefinically unsaturated monomers, in the presence of water and stabilizers. The polymer content of the formed polymer emulsion usually is of the order of 50–65% by weight. After leaving the reactor, the polymer emulsion is matured and cooled down in a maturing vessel or cooling tank. These polymer emulsions are also known as dispersions, latexes or lattices, and are widely used in industrial applications, for instance as binders for paints, adhesives or printing inks.

Emulsion polymerization in closed loop reactors has the advantage that a wide range of process parameters, such as pressure or temperature, can be used. Consequently, loop reactors can be used to produce different polymer emulsions. In order to prevent contamination when changing from one grade to another and to prevent skinning through the drying of residues which adhere to the inner sides of the reactor or associated equipment such as cooling tanks, the reactor and associated equipment are often washed after the completion of a polymerization process. To prevent fouling, which would reduce the heat transfer and impair the efficiency of cooling, the cooling tanks and associated equipment may have to be rinsed, even if the same polymer emulsion is produced in the next production course. The loop reactor and associated equipment are washed with a washing medium, e.g., water. This creates large volumes of dilute aqueous latex, also known as whitewater. Though generally only about 0.2% by weight of the total batch needs to be washed from the cooling tanks, the quantity of contaminated washings may be as much as 6–10% of the weight of produced latex, as a result of dilution, especially when other sources of washings are considered. Such sources may be washings from sieves, storage tanks, pumps, and tanker loading hose, all of which represent an economic loss as well as the creation of contaminated water which must be disposed of safely. Generally, the content of polymerized particles in these washings is between 0.5–3 wt. %, though it may be higher or lower. Such particles are for example styrenics, (meth)acrylics, acrylonitrile polymers, vinyl polymers, such as vinylacetate homopolymers and copolymers with (meth) acrylates, α-olefins, ethylene, higher vinyl esters, polyvinylchloride, or hybrids or mixtures thereof. The washings may also contain stabilizing colloids, surfactants, and other salts and additives. The loss of these washings is economically disadvantageous and causes environmental problems.

Another potential problem attending emulsion polymerization in loop reactors is the fluctuation or cycling of the formation of new particles in the start-up stages of the polymerization process, which may occur when the reactor is pre-filled with water phase. In emulsion polymerization processes, including the loop process, stabilizer adheres to the polymer particles formed, so the concentration of free stabilizer in the water phase is reduced. The size of the new particles depends, inter alia, on the stabilizer concentration, the molecular weight and the chemical nature of the stabilizers, and the polarity and the functionality of the monomer or monomer mixture being polymerized. In practice, the size and the number of new particles depend also on physical factors, e.g., temperature and agitation. The number and the diameter of the new particles control the total polymer surface area formed, which may adsorb varying amounts of the original stabilizers. If the concentration of free stabilizer is too low, no new particles are formed. Existing particles are eluted continuously as new raw material is added. The total particle surface area is reduced in the absence of new particles despite the growth of individual particles. Meanwhile, the stabilizer content is approximately constant, the addition of the stabilizer taking place at the same rate as its overflow from the reactor. As a consequence, the reduction of total particle surface area results in the remaining surfaces becoming saturated with stabilizer, when the free stabilizer concentration will rise to the point where new crops of fine particles can be formed again. These cycles, in a well-designed and stable formulation, fade away to give an equilibrium of product overflow balanced by particle creation in a saturated stabilizer environment.

Hence, the object of the invention is to minimize the loss of polymer via washings from the reactor or associated equipment such as cooling tanks and to reduce the economic loss and environmental risk caused by washings disposal. Another object of the invention is to reduce the effects of cycling of the particle size and especially the particle surface area during the early part of the reaction run, to improve process and product stability prior to the establishment of equilibrium within the reactor.

SUMMARY OF THE INVENTION

The object of the invention is achieved by an emulsion polymerization process using a reactor as described in the opening paragraph, wherein the carrier liquid is wholly or partially made up of washings used for washing one or more parts of the same or a different polymerization reactor and/or associated equipment. Such washings are contaminated with compatible material in solution or suspension. The washings may comprise a polymer emulsion of the same general composition to be manufactured by the reactor or a compatible emulsion polymer of a different composition.

BRIEF DESCRIPTION OF THE DRAWINGS

FIG. 1 is a schematic of a loop reactor system according to the invention.

DETAILED DESCRIPTION OF THE INVENTION

In accordance with the invention, the re-use of washings, or whitewater, not only has the economic and environmental advantage that no polymer content is lost by washing, but the recycled polymer particles also shorten or eliminate particle formation cycling during the early stages of the process, leading to a more consistent product and eliminating the risk of sudden massive coagulation. Due to the polymer particles in the re-used washings, the initial average particle size is larger and the surface area/volume ratio is lower, giving greater stabilizer concentration on particle surfaces. Not only is the stability during both the start-up of manufacture and the subsequent production improved, leading to less polymerization grit and reactor wall fouling, but also the final average particle size may actually be finer in some cases where coalescence of particles would otherwise occur due to lack of stabilization. Lower stabilizer levels may be used, leading to lower cost products with better water resistance.

The stabilizers, such as surface-active agents, preferably are pumped into the circuit, generally as part of the water phase, through or upstream of the driving means, normally a circulating pump. This provides extra mechanical stability for the polymer particles where it is most required, i.e. over the part of the circuit where they are most subjected to shear. Additionally, this has the advantage of distributing the incoming stabilizers efficiently throughout the circulating reaction product. The monomers preferably enter the stream immediately downstream of the pump where the free surfactant concentration is at its highest, encouraging the formation of new particles. The outlet for the formed polymer emulsion preferably is located immediately upstream of the stabilizer inlet, where the conversion is highest.

In a preferred embodiment of the process according to the invention, the washings to be re-used are fed to the reactor either continuously or intermittently, optionally pre-mixed with fresh water phase, at a point between the polymer emulsion outlet and the driving means. In that way, the washings are thoroughly mixed with the stabilizers and, optionally, the fresh water phase by the driving means.

In a further preferred embodiment, the washings are fed to a carrier liquid make-up tank, more specifically a water phase make-up tank, and become part of the carrier liquid which is fed continuously to the reactor during the continuous polymerization process.

The concentration of polymer particles in the washings is within the range of 0.01% to 65% by weight, preferably between 0.1% and 15% by weight.

Most addition polymerization processes are preferably carried out with the temperature of the reactor charge ranging from 35° C. to about 120° C., preferably from about 55° C. to about 80° C. However, for the production of particular lattices other temperature ranges may be preferred.

The pressure in the reactor, another influential process parameter, can be controlled by means of a pressure sustaining valve. To prevent or reduce turbulence within the reactor it is usual to operate under a pressure of 0.3–0.5 MPa, which avoids cavitation. However, it is easy to increase the working pressure to 3.5–7 MPa or higher if so desired, e.g., to encourage the solubility of gaseous monomers such as ethylene.

Next to temperature and pressure, another important parameter of the process which affects the properties of the polymer emulsion to be formed is the Mean Residence Time (MRT) of materials within the reactor. The MRT is calculated by dividing the reactor volume by the total volume of incoming raw materials entering in one minute. A further process parameter, the recycle-to-feed ratio, preferably is between 20:1 and 150:1.

The monomers are addition polymerizable olefinically unsaturated compounds of one or more types and are preferably premixed with an initiator. Monomers that can be used in a polymerization process according to the invention are for example vinyl and allylic and related monomers, including vinyl chloride, vinyl esters, such as Veova® 10 (available from Shell); (meth)acrylic acid, (meth)acrylates, such as butyl(meth)acrylate; styrene, and alkylenes, such as butadiene, ethylene or higher α-olefins, and a range of specialty monomers, including acids, amides, nitrites, sulfonates, polymerizable surface-active substances, and polymerizable adhesion promoters.

The carrier liquid may be any suitable liquid, but in most cases is a so-called water phase. The water phase may comprise, together with water, stabilizers, colloids, buffers for pH control and/or an initiator. The stabilizers or surfactants may be cationic or amphiteric, but are preferably anionics, nonionics or mixtures thereof. Colloids may comprise, inter alia, polyvinyl alcohols of a wide range of compositions, hydroxy ethyl celluloses and modified products in a range of molecular weights, ethoxylated starches, polyvinyl pyrrolidone, poly(meth)acrylic acids and their sodium, potassium, and ammonium salts or mixtures of any of the foregoing materials. Initiators may be redox initiators formed by couples of oxidizing and reducing agents. Suitable oxidizing agents are for instance alkali metal and ammonium salts of peroxysulphuric acid, e.g., sodium peroxy sulphate; hydrogen peroxide; organic hydroperoxides, e.g., t-butyl hydroperoxide; and alkali metal salts of (per)manganates and (per)chlorates. Suitable reducing agents are, e.g., alkali metal and ammonium salts of bisulphites, metabisulphites, thiosulphates, and hypophosphorous acid, or in some cases the free acids themselves; sulphur dioxide; gaseous hydrogen in the presence of finely divided platinum or palladium or other noble metals or a mixture thereof; organic compounds and salts such as erythorbic and ascorbic acids and their alkali metal salts; certain ketones; and hydrazine and its derivatives.

To facilitate the production of the initiating supply of free radicals, it is preferred that a transition metal salt, e.g., ferrous iron or ferric iron, should also be present in small quantities, e.g., 1.5–15 parts per million.

None of the above materials should be considered to limit the current invention. The addition of washings from tanks or other equipment does not involve a general requirement to reformulate the composition of the raw materials in any way.

The process according to the invention is carried out efficiently in an emulsion polymerization reactor having:
- one or more circulation loops with one or more inlets for monomers, stabilizers, and a carrier liquid and one or more outlets for polymer emulsion;
- driving means for continuously circulating the reactor charge within the circulation loop;
  characterized in that the one or more inlets for the carrier liquid, generally water phase, is connected, either directly or indirectly, to a source of washings used earlier for washing the same or a similar polymerization reactor and/or associated equipment. For instance, the reactor may comprise cooling tanks optionally fitted with agitators, the tanks having a main outlet for the polymer emulsion and a washings outlet which is connected to a holding tank in which washings from one or more sources are collected and from which they are pumped in a controlled manner to an inlet in the loop reactor, optionally via one or more further tanks in which the water phase is prepared.

Instead of cooling tanks, the reactor may have other cooling means such as jacketed pipes, which run straight to, e.g., drums or storage tanks.

The reactor may have one loop or have several loops in parallel or in series. The loop or loops may have the shape of a helical coil or may follow a meandering shape or any other suitable shape.

The washings may provide part or all of the water used in the preparation of the water phase, and this may partially or wholly replace a separate flow of this material into the reactor. If fresh water phase is used in combination with the washings, the washings inlet is preferably located near an inlet for fresh water phase. Advantageously, the inlet for fresh water phase may be the same inlet as the washings inlet, so the fresh water phase and the washings are pre-mixed before entering the circulation loop. For example, this can be achieved by connecting one or more sources of washings to the circulation loop via the inlet for the water phase.

The length of the tubular part of the loop reactor may be up to about 2000 times or more larger than the diameter of the tubular part. This gives an excellent ratio between the cooling surface on the one hand and the working volume on the other.

Addition polymerization reactions have an energy of activation and are generally exothermic. Since these reactions give an optimized reaction rate at certain temperatures, it is preferred that the loop reactor is provided with temperature control means. Such means may for example include jackets surrounding parts of the circulation loop. Water or another heat exchange medium or cooling fluid is then led through the jackets in order to cool or to heat the reactor charge. Regulation of the water flow provides a sensitive method of temperature control. Alternatively, cooling can be provided by using water troughs, water baths or sprays. Water or other cooling fluids can be used in a single pass or in recycling systems. The rate of heat removal may be regulated by controlling either or both of the variables of cooling medium temperature and rate of flow. Cooling jackets may be simple or may contain baffles or other means of creating turbulence for improving the efficiency of heat removal. Cooling jackets may be continuous or in sections or dispensed with entirely in the case of cooling sprays. Use may even be made of air blasts as the heat removal medium, controlled in a similar manner to liquid cooling fluids as regards temperature and flow. In the case of air cooling, finned pipes are often employed.

The invention is further described in FIG. 1, showing schematically a loop reactor system for performing a polymerization process according to the invention. The shown system comprises a loop reactor 1 having a schematically drawn circulation loop 2 with an inlet 3 for monomers, a water phase inlet 4, and an outlet 5 for polymer emulsion. Driving means, consisting of a circulation pump 6, continuously circulate the reactor charge within the circulation loop 2 in the direction of the arrows drawn in the loop 2. The outlet 5 is located just in advance of the circulation pump 6 and upstream of the water phase inlet 4, where the conversion is highest. The outlet 5 for polymer emulsion is connected to a reactor cooling tank 7, where the formed polymer emulsion matures and cools.

Starting the polymerization process, the reactor is first charged with a water phase containing stabilizers, the reducing agent of a redox couple, and optionally other additives via inlet 4. Raw material, including monomers and the oxidizing agent of the used redox initiator couple, are introduced into the reactor 1 via inlet 3. After the reactor 1 has been charged, continuous feeding of the loop reactor 1 with the raw material and the water phase is commenced. Meanwhile, part of the reactor charge is withdrawn from the reactor 1 via outlet 5 at a rate equal to the rate of total raw material and carrier liquid feeding.

In order to prevent fouling and contamination when changing from one grade to another, the reactor 1 and associated equipment, such as the cooling tank 7 or troughs, sieves, hose, pipes, etc., are regularly rinsed and washed with water, or another suitable washing liquid if so desired. After flowing through the reactor 1 and/or other washed parts, the washings are drained off to a storage tank or sump 8. Washings from other sources, such as other loop reactors or batch reactors 9, may also be collected in the sump 8, as indicated by the arrow 9 from such other loop reactors or batch reactors 9 in FIG. 1. The washings level in the sump 8 is controlled by means of a level switch 10, which is connected to a pump 11 for the supply of biocides from a biocide reservoir 12. Subsequently, the washings are passed on to a further tank 13 fitted with agitators 14 driven by a motor 15. Further transportation to a water phase make-up tank 16 is controlled by control means 17. In the water phase make-up tank 16, water phase to be used in the polymerization process is made from the washings and optionally from fresh water, stabilizers, or other additives. When running the reactor 1, water phase is drawn off from the water phase make-up tank to the inlet 4.

The invention is further illustrated by the following examples, demonstrating that, on the one hand, the properties of the polymer emulsions obtained by a process according to the invention are not inferior to the properties of the polymer emulsions made according to conventional processes, while, on the other hand, substantial economic and environmental advantages are obtained. In these examples the compositions listed below are available as indicated.

Bevaloid® 691 an anti-foaming agent, available from Rhone-Poulenc at Beverly, Great Britain;

Veova® 10 a structural mixture of vinyl esters comprising mainly $C_{10}$ tertiary branched aliphatic fatty acids, with the oxygen link between the vinyl group and the alkyl group attached in each case to the tertiary carbon. Veova® 10 is commercially available from Shell Chemicals;

Piror® preservative, commercially available from Union Carbide.

In the examples, the mean particle size and the particle size distribution were determined using a Coulter® LS 230 instrument using laser light scattering.

The storage stability was found to be "excellent" if an emulsion did not change in any obvious way over six months, and was found to be "good" if a trace of syneresis (surface liquid) occurred which could be fully re-incorporated with gentle mixing.

The viscosity was measured at room temperature with a Cone and Plate® Viscosity meter, as well as with a Rotothinner®, both apparatuses being available from Sheen Instruments.

The gloss was measured at angles of 60° and 85° by means of a Trimicrogloss® Meter of Sheen Instruments.

EXAMPLE 1 AND COMPARATIVE EXAMPLE A

Using a loop reactor with a loop having a length of approximately 65 metre and an internal diameter of approximately 43 mm, two emulsions were prepared using the formulations given in the following Table 1:

TABLE 1

| Phase | Constituents | Example 1 | Comparative example A |
|---|---|---|---|
| Monomer phase | Vinyl acetate | 32.70 wt % | 32.70 wt % |
| | Veova ® 10 | 17.60 wt % | 17.60 wt % |
| | t-butyl hydro peroxide, etc. | 0.28 wt % | 0.28 wt % |
| Water phase | Water | 31.43 wt % | 47.17 wt % |
| | Cooling tank washings | 15.74 wt % | — |
| | Stabilizers, pH controls and redox initiators | 2.05 wt % | 2.05 wt % |
| Preservatives | Piror ® | 0.20 wt % | 0.20 wt % |

The stabilizers were a mixture of an alkyl phenol ethylene oxide ethoxylate sulphate, sodium salt, and hydroxyethyl cellulose. The pH control was sodium acetate and the redox initiator was sodium metabisulphite.

The preservatives were added after the product was cooled to ambient temperature and before filtration and pumping to drums or storage tanks.

The cooling tank washings as used in Example 1 contained about 3–4 wt % of solids consisting of mixed tank washings from products obtained by emulsion polymerization of the same monomers in the same loop reactor.

The process conditions for Example 1 and Comparative example A were the same in both cases, the average pressure being about 4 Bar and the Mean Residence Time being about 7.5 minutes. The production rate was 800 liters/hour, the temperature of the reactor charge was 60–69° C. At the outlet the amount of unreacted monomer was 2–3 wt %. At the entry to the cooling tank, the amount of unreacted monomer was reduced to 1.3 wt %.

Subsequently, the solids content, viscosity, and pH were measured. The results are as given in the following Table 2, in which the mode distribution indicates the most common particle size:

TABLE 2

| | Example 1 | Comparative example A |
|---|---|---|
| Total solids content | 51.8 wt. % | 51.9 wt. % |
| Viscosity (13 s$^{-1}$) | 8.6 poise | 6.3 poise |
| Viscosity (53 s$^{-1}$) | 83.8 poise | 2.6 poise |
| pH | 4.8 | 4.7 |
| Mode distribution | 410 nm | 499 nm |

The reduction of the particle size in Example 1 was over 8% compared to Comparative example A, accompanied by a significant increase in viscosity. Other properties were not negatively influenced.

EXAMPLE 2 AND COMPARATIVE EXAMPLE B

A second series of emulsions was prepared in the loop reactor using the formulations given in the following Table 3:

TABLE 3

| Phase | Constituents | Example 2 | Comparative example B |
|---|---|---|---|
| Monomer phase | Vinyl acetate | 43.37 wt % | 43.37 wt % |
| | Veova ® 10 | 9.57 wt % | 9.57 wt % |
| | t-butyl hydroperoxide | 0.22 wt % | 0.22 wt % |
| Waterphase | Water | 21.04 wt % | 43.80 wt % |
| | washings | 22.76 wt % | — |
| | stabilizers pH controls and a redox initiator | 2.58 wt % | 2.58 wt % |
| | Bevaloid ® 691 | 0.06 wt % | 0.06 wt % |
| Preservatives | Piror ® | 0.20 wt % | 0.20 wt %[1] |

[1] 0.06 wt. % is missing in Ex. 2 and Comp. ex. B

The stabilizers were a mixture of an alkyl phenol ethylene oxide ethoxylate sulphate, sodium salt, and hydroxyethyl cellulose. The pH control was sodium acetate and the redox initiator was sodium metabisulphite.

Again, the preservatives were added after the product was cooled to ambient temperature and before filtration and pumping to drums or storage tanks.

The cooling tank washings consisted a mixture of effluent washings and water in a weight ratio of 1:4.

The formulations of Example 2 were polymerized in the loop reactor in a series of six runs. After each run the cooling tanks were washed. The washings were then added to the water used to make the water phase for the new run. The polymerization product of the different runs showed the properties given in Table 4. The storage stabilities were checked after eight weeks.

TABLE 4

Example 2

| Run | Mean particle size (nm) | Mode particle size (nm) | Distribution end (nm) | Storage stability |
|---|---|---|---|---|
| 1 | 492 | 449 | 2200 | Excellent |
| 2 | 338 | 374 | 900 | Excellent |
| 3 | 486 | 410 | 5000 | Excellent |
| 4 | 475 | 449 | 2500 | Good |
| 5 | 468 | 410 | 3000 | Excellent |
| 6 | 484 | 410 | 4000 | Excellent |
| Average | 457 | 417 | 2933 | |

The formulations of Comparative Example B were polymerized in the loop reactor in a series of five runs. No effluent of the cooling tanks washings was recycled into the loop reactor. The polymerization product of the different runs showed the properties given in Table 5:

TABLE 5

Comparative example B

| Run | Mean particle size (nm) | Mode particle size (nm) | Distribution end (nm) | Storage stability |
|---|---|---|---|---|
| 1 | 483 | 449 | 2500 | Excellent |
| 2 | 493 | 449 | 2500 | Good |
| 3 | 478 | 449 | 2500 | Excellent |
| 4 | 403 | 410 | 1000 | Excellent |
| 5 | 463 | 410 | 2500 | Excellent |
| Average | 464 | 433 | 2300 | |

In Examples 3–7, high trade quality silk paints were produced from the emulsions obtained in Example 2. In Comparative Example C, a high trade quality silk paint was produced from the emulsions obtained in Comparative example B. The results are given in the following Table 6:

TABLE 6

| Example | Viscosity Cone & Plate ® | Viscosity Roto-thinner ® | Gloss 60° | Gloss 85° | Opacity | Flow |
|---|---|---|---|---|---|---|
| 3 | 1.15 | 8 | 44% | 85% | Good | Excellent |
| 4 | 1.30 | 12 | 43% | 88% | Good | Excellent |
| 5 | 1.20 | 13 | 43% | 88% | Good | Excellent |
| 6 | 1.35 | 12 | 43% | 89% | Good | Excellent |
| 7 | 1.30 | 13 | 44% | 86% | Good | Excellent |
| C | 1.25 | 12 | 41% | 87% | Good | Excellent |

The paints of Examples 3–7 give a minimum of 2% extra 60° gloss and an average of 2,4% more 60° gloss than the paint of Comparative Example C. In other respects the results were not significantly influenced.

The invention is further illustrated by the following claims, which, however, are not intended to limit the scope thereof.

What is claimed is:

1. An emulsion polymerization process comprising the steps of:

charging a loop reactor with raw material and a carrier liquid, the carrier liquid including washings which have been used for washing one or more parts of the same or a different loop reactor and/or associated equipment; then continuously feeding the loop reactor with the raw material and with the carrier liquid; and continuously withdrawing part of the reactor charge from the loop reactor at a rate equal to the rate of total raw material and carrier liquid feeding, the loop reactor comprising one or more circulation loops with one or more inlets for raw material, one or more inlets for a carrier liquid, and one or more outlets, and one or more driving means for continuously circulating the reactor charge within the one or more circulation loops.

2. The emulsion polymerization process according to claim 1, wherein the washings are fed to the reactor continuously or intermittently at a point between at least one of the one or more outlets and the driving means.

3. The emulsion polymerization process according to claim 1, further comprising feeding washings, which have been used for washing one or more parts of the same or a different loop reactor and/or associated equipment, to a carrier liquid make-up tank where the washings become part of the carrier liquid which is fed continuously to the reactor during the continuous polymerization process.

4. The emulsion polymerization process according to claim 1, wherein all the carrier liquid is derived from the washings.

5. The emulsion polymerization process according to claim 1, wherein the water in the carrier liquid is derived from the washings and fresh water.

6. The emulsion polymerization process according to claim 1, wherein the concentration of polymer particles in the washings is within the range of 0.01% to 65% by weight.

7. The emulsion polymerization process according to claim 6, wherein the concentration of polymer particles in the washings is within the range of 0.1% to 15% by weight.

8. The emulsion polymerization process according to claim 1, wherein the raw material includes monomers, and the carrier liquid includes stabilizers and optionally other additives.

9. The emulsion polymerization process according to claim 1, wherein the polymer to be formed is insoluble in the carrier liquid.

10. An emulsion polymerization reactor comprising:

one or more circulation loops having one or more inlets for raw material and for a carrier liquid, and having one or more outlets, one or more of the inlets for the carrier liquid being connected to a source for washings used earlier for washing a polymerization reactor and/or associated equipment; and driving means for continuously circulating the reactor charge within the circulation loop.

11. The reactor according to claim 10, wherein one or more of the inlets for the carrier liquid are connected to a source of fresh water.

12. The reactor according to claim 11, wherein the one or more inlets for the carrier liquid which is connected to the source for washings is also connected to the source of fresh water.

13. The reactor according to claim 11, wherein the one or more inlets for the carrier liquid which is connected to the source for washings is located proximate the one or more inlets for the carrier liquid which is connected to the source of fresh water.

14. The reactor according to claim 10, wherein the inlet for the carrier liquid is in or upstream of the driving means.

15. The reactor according to claim 10, wherein the associated equipment includes cooling tanks.

16. An emulsion polymerization process comprising charging a loop reactor with raw material and a carrier liquid, the carrier liquid comprising water recirculated from water used to wash one or more parts of the same or a different polymerization reactor and/or associated equipment; continuously feeding the loop reactor with the raw material and with the carrier liquid; and continuously withdrawing part of the reactor charge from the loop reactor at a rate equal to the rate of total raw material and carrier liquid feeding.

* * * * *